United States Patent [19]

Dew et al.

[11] Patent Number: 5,563,750
[45] Date of Patent: Oct. 8, 1996

[54] SHAFT MOUNTING FOR A DISK FILE

[75] Inventors: Graham N. Dew, Winchester; Michael W. Hall, Hampton; Anthony R. Hearn, South Wonston; Julian T. Young, Medstead, all of England

[73] Assignee: International Business Machines Corporation, Armonk, N.Y.

[21] Appl. No.: 761,863

[22] PCT Filed: Jan. 8, 1990

[86] PCT No.: PCT/GB90/00021

§ 371 Date: Sep. 6, 1991

§ 102(e) Date: Sep. 6, 1991

[87] PCT Pub. No.: WO91/10995

PCT Pub. Date: Jul. 25, 1991

[51] Int. Cl.$^6$ ............................................. G11B 5/012
[52] U.S. Cl. ............................. 360/98.01; 360/98.07; 360/98.08
[58] Field of Search ........................... 360/98.01, 98.07, 360/98.08, 99.08, 99.12

[56] References Cited

U.S. PATENT DOCUMENTS 4,875,117  10/1989  Slezak ................................. 360/98.01

Primary Examiner—A. J. Heinz
Attorney, Agent, or Firm—Richard E. Billion

[57] ABSTRACT

A disk file has a frame with a non-rotatable shaft (2) extending in an axial direction between opposed wall portions of the frame. The shaft is clamped at one end to the frame by a screw (8) passing through an opening in the wall and axially into the shaft. This arrangement is susceptible to tilting of the shaft due to differential thermal expansion if the frame wall (1) and the shaft have dissimilar coefficients of thermal expansion. A bush (9) is located between the screw and the shaft. The bush is held in the wall by an interference fit, and has a coefficient of thermal expansion similar to that of the shaft. The inclusion of the bush greatly reduces problems due to differential thermal expansion.

5 Claims, 5 Drawing Sheets

SHAFT MOUNTING FOR A DISK FILE

FIELD OF THE INVENTION

This invention relates to disk files, and in particular to a method of mounting a stationary shaft on which rotatable recording subassemblies such as a disk stack or rotary actuator can be mounted.

BACKGROUND OF THE INVENTION

One of the most common methods of storing digital data is to use a stack of one or more disks, mounted for simultaneous rotation about a common axis. Data are stored in concentric tracks about this axis on the surfaces of the disk or disks. The data are written onto and/or retrieved from these tracks by a transducing head, which can scan radially across the disk surface. By rotating the disk to the correct azimuthal angle, and moving the head to the correct radial distance, it is possible to access any point on the disk surface. The constant desire to increase the density of data storage on such disks means that the separation between adjacent tracks must be made as small as possible. This demands very accurate positioning of the head in order for the correct track to be located.

In one type of disk file, a stationary spindle shaft is rigidly fixed directly to a support structure. This support structure generally forms part of the walls of the disk file. The disks are mounted on a hub, which is caused to rotate about the spindle shaft by an electric motor within the hub. The heads are mounted on an actuator which produces their desired radial movement. This can be achieved either by rotating the actuator about a stationary shaft parallel to the spindle shaft, so that the head pivots in an arc across the disk surface, or else by linear motion of the actuator so that the head moves across the disk surface towards and away from the disk centre, effectively in a purely radial direction. The actuator is also mounted on the support structure: in the case of a rotary actuator, via an actuator shaft.

Often the spindle shaft is made of steel, which improves the efficiency of the in-hub motor, whilst the support structure is aluminium for lightness. Disk files of this general design are described in EP-0222939-A1 and U.S. Pat. No. 4,797,762.

For correct operation of the disk file, it is essential that each head can be accurately positioned over the desired track on the disk surface. This means that any uncontrolled movement of the head and the disk surface must be minimised, implying that the mountings and supports for the disk and the head must be as secure as possible. Usually the support structure comprises at least one piece of cast metal, the cast metal imparting mechanical strength and structural rigidity to the device. Note that in the type of disk file described above, the materials of the shaft and its support structure may be different, causing a potential problem with differential thermal expansion. Careful design of the means of attachment of the spindle shaft and actuator to the support structure is necessary to minimise unwanted movement of the disk and head.

U.S. Pat. No. 4,797,762 discloses one method of securing a shaft to its support structure in a disk file. The bottom of the spindle shaft is firmly glued into a hole in a first support structure, whilst the top of the spindle shaft is attached to a second support structure using a shouldered washer or bush. The shaft is bolted to the washer and the washer glued to the outer casing. The hole for the washer in the second support structure is slightly larger than the washer itself, allowing a certain leeway lest the holes for the top and bottom of the shaft are not quite properly aligned. By allowing this freedom in positioning of the washer, the washer can be glued into place to retain the shaft end in a stress-free manner. In this device, in common with many others, the top and bottom of the shaft are attached to two separate support structures. Such a design is susceptible to misalignment of the two shaft holes, and may also not hold the shaft as rigidly as desired.

The stability of the disk file can be improved if both ends of the shaft are attached to the same support structure. This is the case in EP-0222939-A1, in which a spindle shaft is attached at each end to two flanges of a common support structure by a bolt perpendicular to the axis of the shaft that passes into the thickness of the disk file wall.

This means of attachment has the disadvantage that it can only be used for certain forms of support structure, and it also requires the disk file wall to be thick enough to accommodate the bolt, which increases the weight and decreases the storage capacity of the disk file.

An alternative design, described in pending PCT application PCT/GB89/00267, is to attach the spindle shaft at both ends to holes in a single support structure. For assembly reasons, it is necessary for the shaft to be no longer than the interior wall separation that it spans, making it difficult for any portion of the shaft to protrude into the holes in the support structure. In this case, the shaft can be clamped to the support structure, allowing for a thinner and lighter support structure than in EP-0222939-A1. In PCT/GB89/00267, the spindle shaft is clamped to the support structure by bolts that pass through the support structure wall and down the shaft axis, with the clamping force being transferred to the shaft end by the support structure.

Clamping the shaft to the support structure in this manner however, can increase problems with thermal distortion if the shaft and the support structure have different coefficients of thermal expansion. To keep the central axis of the shaft stationary with respect to the support structure as the temperature changes, the shaft end and the inner surface of the support structure should slip past one another in the radial direction. In practice however, there is a tendency for the surfaces to lock together at their point of contact where friction is greatest. It is this point, rather than the shaft axis, that remains stationary. Both the shaft axis and support structure will then expand away from this point, producing a lateral shift between them, dependent on their respective coefficients of thermal expansion. Because the locking point is generally determined by manufacturing irregularities, and may vary due to wear during the lifetime of the disk file, this shift between the support structure and the shaft axis is essentially unpredictable. This makes it especially difficult for the servo system to compensate for any head/disk misalignment produced by the resultant tilting of the spindle or actuator, particularly where a dedicated servo system is used.

The problem of differential expansion is therefore particularly acute when the primary contact between the shaft and the support structure at both ends is in a plane perpendicular to the spindle shaft axis. This is not the case in U.S. Pat. No. 4,797,762, because the spindle shaft is firmly located at the end where it protrudes into and is bonded to the main support structure.

DISCLOSURE OF THE INVENTION

Thus the prior art does not present a satisfactory method of mounting a shaft at both ends to a light, but rigid, single support structure that is capable of providing the necessary immunity from head/disk misalignment due to differential thermal expansion and other effects.

Accordingly, the invention provides a disk file having: a support structure including opposed wall portions; a non-rotatable shaft extending in an axial direction from one of said opposed wall portions to the other; a recording subassembly rotatably mounted on said shaft; clamping means for clamping at least one end of said shaft to the respective opposed wall portion in an axial direction, wherein said shaft end has a coefficient of thermal expansion dissimilar from that of said wall portion, so that as a result of differential thermal expansion the two are susceptible to relative shifting movement in a direction transverse to the shaft axis; and a load transfer member between the clamping means and shaft end; the disk file being characterised in that:—said load transfer member is an interference fit in the wall portion and has a coefficient of thermal expansion sufficiently close to that of the shaft to reduce the tendency to relative shifting movement due to differential thermal expansion over the contact area between it and the shaft end.

By employing the load transfer member, the invention reduces head/disk misalignment due to the differential expansion between the shaft and its support structure. The load transfer member is held in a hole in the support structure by an interference fit that produces elastic compression of the support structure and the load transfer member. If no interference fit were present, a gap would open up between these two on thermal cycling due to the difference in their respective coefficients of thermal expansion. With the interference fit however, no gap arises as the elastic compression is partially released. The load transfer member and the support structure both expand slightly, thereby staying in direct contact. The degree of interference between the load transfer member and the support structure should be such that interference is maintained throughout the temperature range likely to be experienced.

Throughout this temperature range, the load transfer member is held tightly in the support structure by the interference fit, and so remains firmly located with respect to the support structure. The load transfer member and the shaft have similar coefficients of thermal expansion and will expand together at approximately the same rate, so that they too should stay in the same position with respect to one another. Since the support structure and load transfer member maintain their relative positions, and so do the load transfer member and the shaft, it follows that the relative positions of the support structure and the shaft are also unchanged. The invention therefore greatly reduces any movement of the shaft relative to its support structure due to differential thermal expansion, and so helps to decrease the possibility of head/track misalignment.

Ideally, the coefficient of thermal expansion of the load transfer member is the same as that of the shaft. However, it is not absolutely necessary that the coefficients are the same providing they are sufficiently close that the tendency to relative movement caused by differential expansion stresses can be resisted by the clamping load.

In a preferred embodiment of the invention, both wall portions are part of a single metal casting, with both ends of the shaft attached to the respective wall portion in like fashion, using clamping means for clamping each shaft end to the respective wall portion, and a load transfer member between each shaft end and respective wall portion, each load transfer member being held in the respective wall portion by an interference fit. The single casting greatly enhances the rigidity of the device, and the invention is of especial utility for such all-round one-piece castings, in which it is not possible to use a shaft that protrudes into or through the support structure. In such cases, the contact surface between the shaft and support, if no load transfer member was used, would necessarily be perpendicular to the shaft axis. As described above, such an arrangement is particularly susceptible to the problem of differential thermal expansion. However, it should be recognised that the invention is applicable to other types of support structure, for example two piece structures, wherever at least one shaft end is attached by axial clamping to the adjacent wall portion.

Preferably, the clamping means is a screw that passes through the wall portion and said load transfer member, and is threaded into said shaft end along the shaft axis. The load transfer member is a bush of substantially cylindrical shape, separating the screw from the wall portion. Preferably, it includes an outward flange at one end between the shaft end and the wall portion. In accordance with the invention, the bush is held in its hole in the support structure by means of an interference fit. Preferred materials are aluminium for the wall portions, and steel for the bush, shaft, and screw, although other materials are possible providing the bush, shaft and screw have sufficiently similar coefficients of thermal expansion as discussed above.

Problems due to differential thermal expansion may be further reduced according to a further preferred feature of the invention, by relieving the end of the shaft, so that the load transfer member contacts the shaft end near to the shaft axis. Such relieving ensures that any locking between the shaft and load transfer member or support structure must occur relatively close to the central axis of the shaft. This reduces the maximum possible distance of the centre of expansion from the shaft axis, which in turn reduces the maximum possible magnitude of any shift between the shaft axis and the support structure due to differential thermal expansion.

Although the intended primary application of the invention is to the mounting of the spindle shaft of the disk stack subassembly to its support structure, the invention is also applicable to rotary actuator shafts which are similarly mounted between opposed wall portions of the support structure.

DETAILED DESCRIPTION OF THE INVENTION

Figure 1:
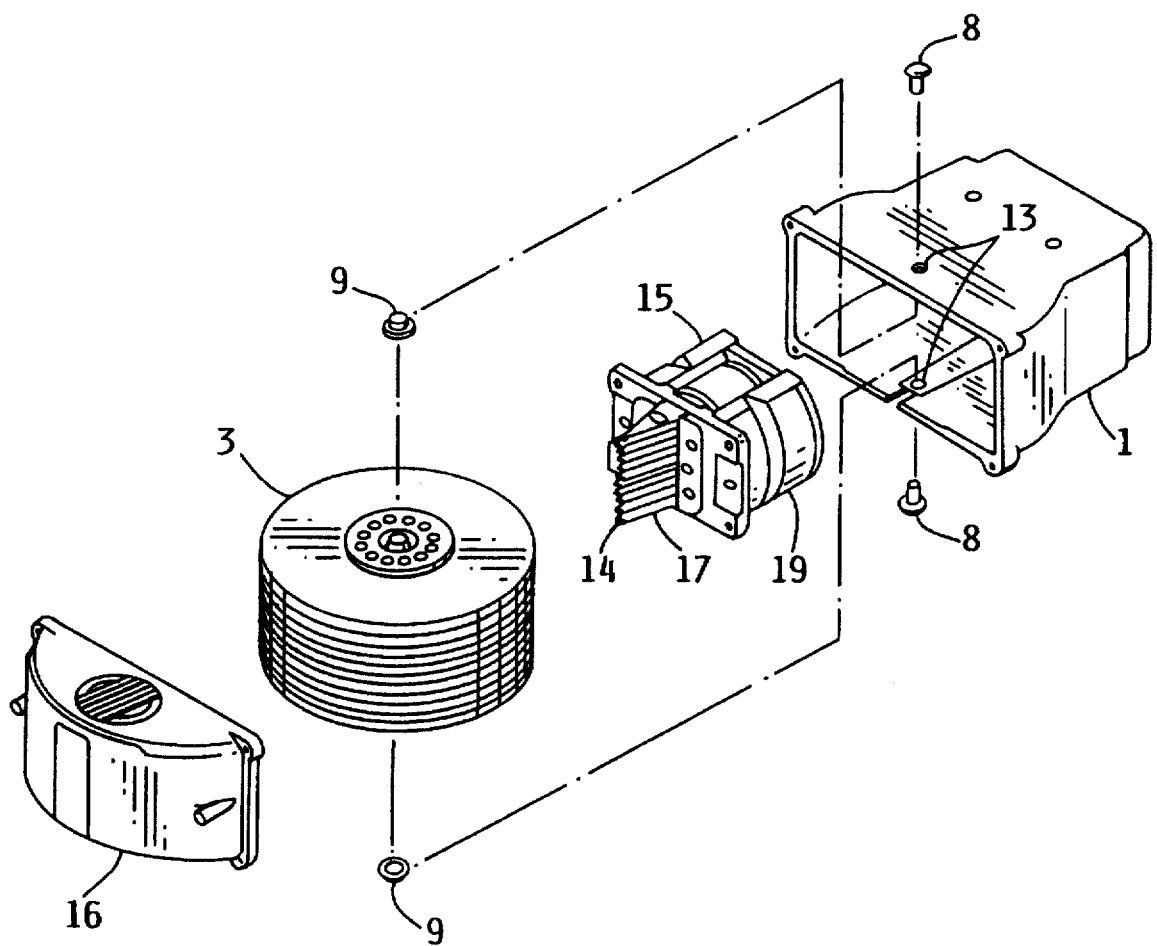
FIG. 1 presents an exploded view of the major components of a disk file according to the present invention.
Figure 2:
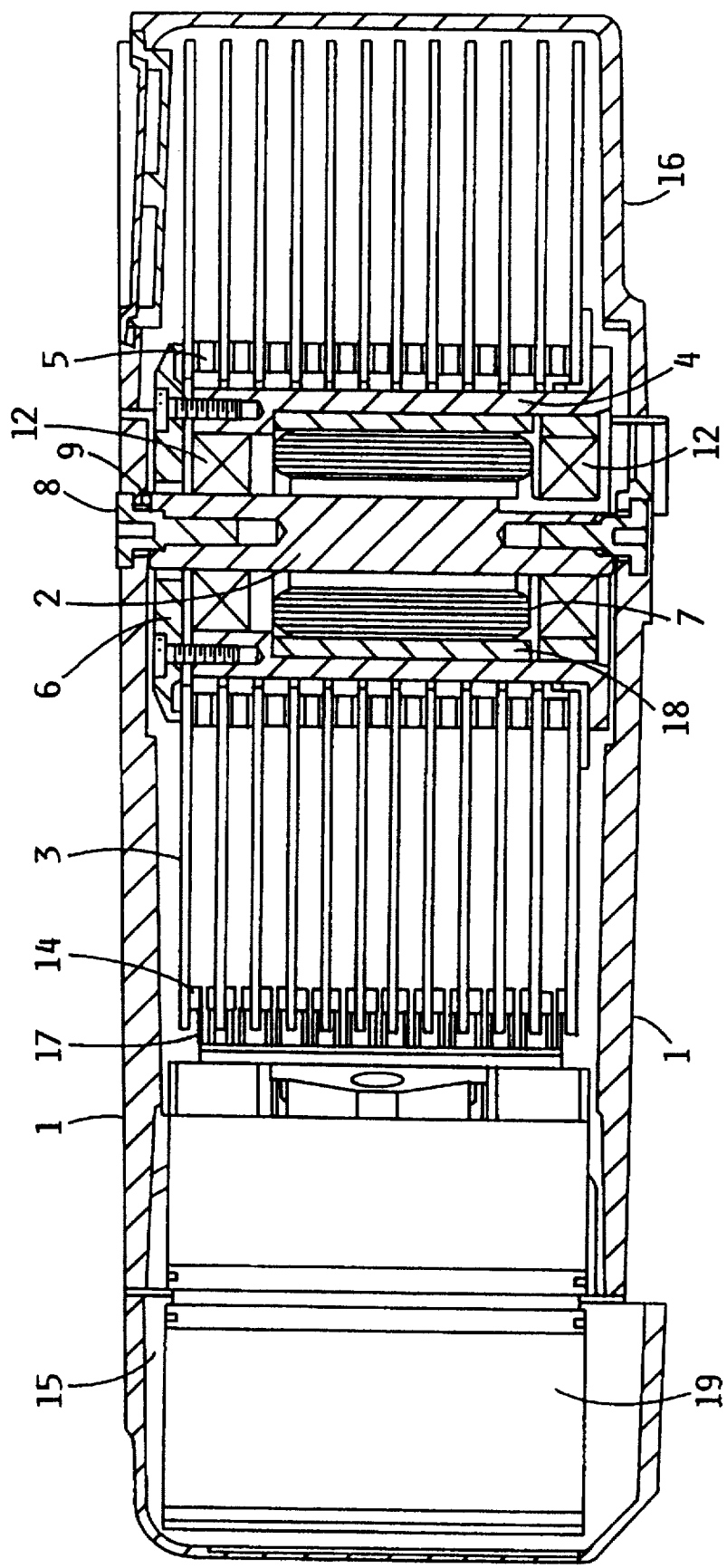
FIG. 2 is a cross-section through the disk file of FIG. 1.

FIGS. 1 and 2 illustrate a disk file embodying the invention, in which the data are stored in concentric tracks on the disk surfaces. The general features of such devices are well-known, and will not be discussed in detail.

Data storage disks 3 are mounted on a hub 4, the hub being supported by bearings 12 which enable the hub to rotate about a spindle shaft 2. The disks are separated by disk spacers 5, and retained on the hub by a clamp 6. The hub is rotated by an in-hub electric motor, the stator coils 7 and rotor permanent magnets 18 of which are visible in FIG. 2. Data are read from and/or written onto the disk surfaces by transducer heads 14, mounted on arms 17, which are supported by an actuator 15 for moving the heads across the disk surfaces. The actuator shown is a linear actuator, which is driven towards and away from the disks in a radial direction by a voice coil motor including magnet assembly 19.

In the preferred embodiment, the support structure is a one-piece aluminium casting 1. After the head/disk assembly has been mounted on the casting, a cover 16 is added to provide complete enclosure for the disk file. A pair of holes 13 are located on opposite walls of the casting for mounting the spindle shaft. Both ends of the spindle shaft are mounted in the same way, as shown in more detail in FIG. 3. Following the invention, a bush 9 is held in each hole 13 by an interference fit, and the spindle shaft is firmly attached to the support structure by clamping screw 8. The screw 8 passes through the hole 13 and the bush 9, and down the axis of the spindle shaft 2. The spindle shaft, bush and screw are all made of steel, and have similar coefficients of thermal expansion.

Figure 4:
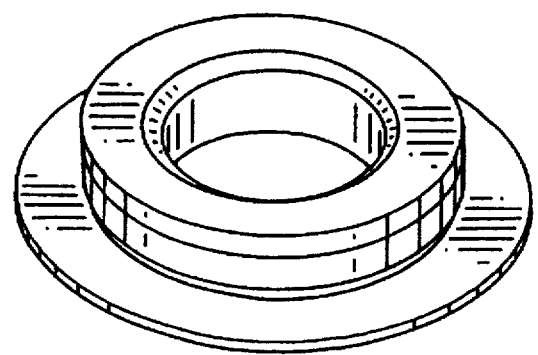
FIG. 4 is an enlarged version of a bush employed in the disk file of FIGS. 1 to 3.

The bush is shown in more detail in FIG. 4. The top of the bush is tapered for easier location into the wall portion, whilst the lower outer face is also relieved to prevent the interference distorting the rim of the receiving hole.

The bush is placed in the aluminium casting using an interference fit. When the disk file is heated, there is a tendency for the aluminium casting to expand away from the steel bush, because the coefficient of thermal expansion for aluminium is greater than for steel. If no interference were present, a gap would open up between the bush and the casting, and the bush would become loose and free to drop out. With the interference fit however, instead of the gap opening up, the steel and aluminium release some of their elastic compression by expanding into this area. The initial degree of interference between the bush and the casting must be such that at least some interference is maintained between them over the whole of the temperature range likely to be experienced.

Because aluminium is less stiff than the steel, it compresses faster as pressure is applied, but equally it also expands faster as this pressure is released. As the bush and outer casing get warmer therefore, most of the gap that would open up, were it not for the interference, is filled by the expanding aluminium. As a result, the steel expands only slightly faster than it would due simply to thermal expansion. Since the aluminium stays in contact with it, the aluminium has an effective rate of thermal expansion around the bush that is very similar to that of steel. This helps to reduce differential expansion between the aluminium casting and both the flange of the steel bush and the head of the steel screw.

In a preferred embodiment, the spindle shaft ends are relieved in the region 10 (seen most clearly in FIG. 3) which reduces the distance from the spindle shaft axis to any point of contact between the spindle shaft and the bush. This in turn minimises the maximum possible shift due to differential thermal expansion of the bush and spindle relative to each other. Typical dimensions of this relieving might be that the spindle shaft diameter reduces from 10 mm to 8 mm along a spindle shaft length of 0.3 mm.

Figure 3:
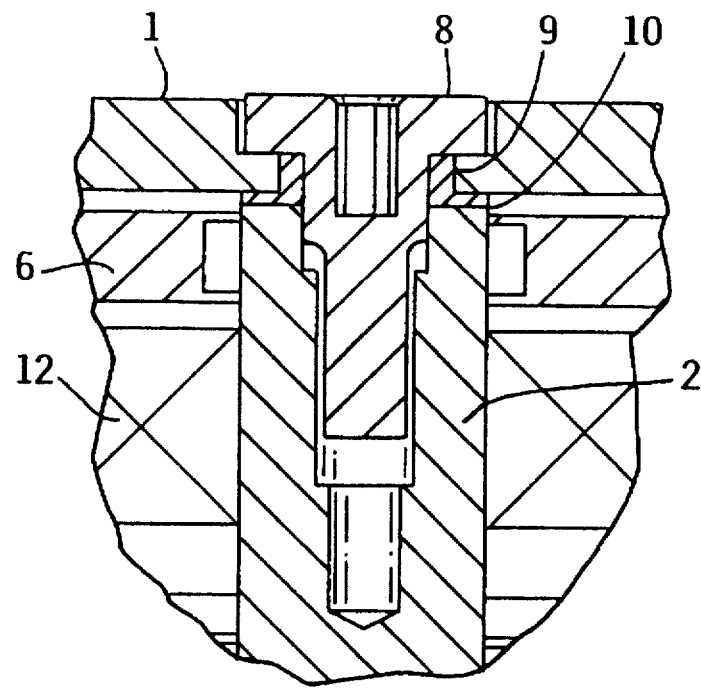
FIG. 3 is an enlarged portion of FIG. 2 showing the mounting details of a shaft in a support structure.

FIG. 5 presents mathematical computer models that illustrate the problem of differential expansion when no load transfer member is present, and show how the problem is largely overcome by the invention. Identical reference numerals to those of FIGS. 3 and 4 are used to represent the same components, namely an aluminium casting 1 as the support structure, a steel spindle shaft 2, and a steel bush 9 as the load transfer member. The spindle shaft is clamped to the casting by a steel screw 8, which passes through the hole in the casting 13, through the bush, and down the central axis of the spindle shaft. In these diagrams, the grid represents the positions of the components after thermal expansion. The coefficient of thermal expansion of aluminium is typically more than twice that of steel. (It is not necessary for the spindle shaft, bush and screw to be made of exactly the same type of steel, but they should all be made from steels having approximately the same coefficient of thermal expansion).

Figure 5A:
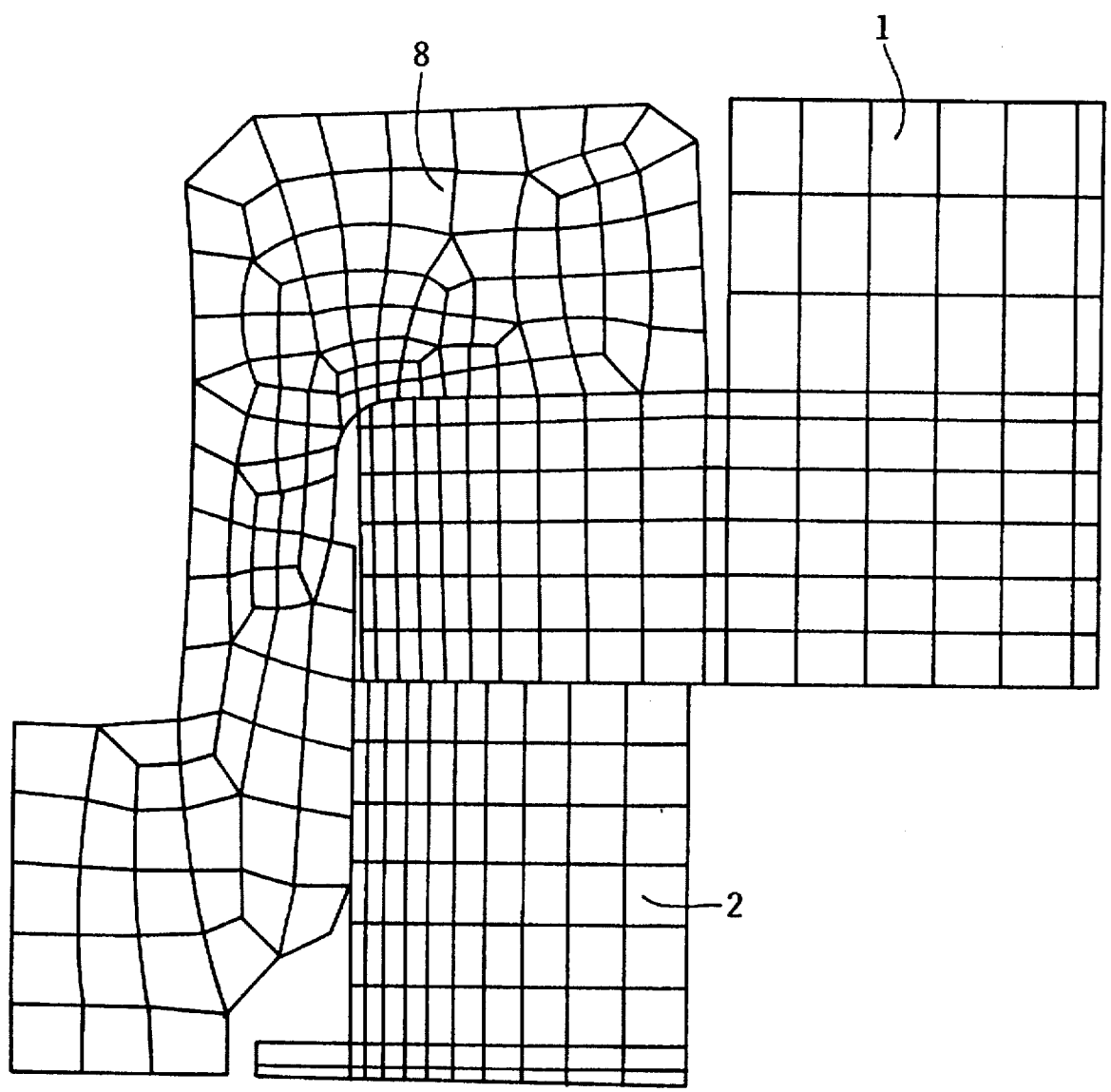
FIG. 5 presents mathematical computer model predictions illustrating the misalignment at the shaft mounting due to differential thermal expansion, with and without a bush.

In FIG. 5a, when no load transfer member is present, it is clear that the vertical grid lines in the spindle shaft are considerably displaced in a horizontal direction from those in the casting. This is because the aluminium expands faster on heating than the steel, necessitating some slip between the two. It is this relative slip that causes problems, because in practice the centre of expansion will not be the spindle shaft axis as shown in FIG. 5a, but rather the point of greatest friction between the spindle shaft and the casting. The point of greatest friction is determined by manufacturing irregularities and wear, and is unpredictable. This leads therefore to a shift between the spindle shaft and its support that is extremely difficult to control.

Figure 5B:
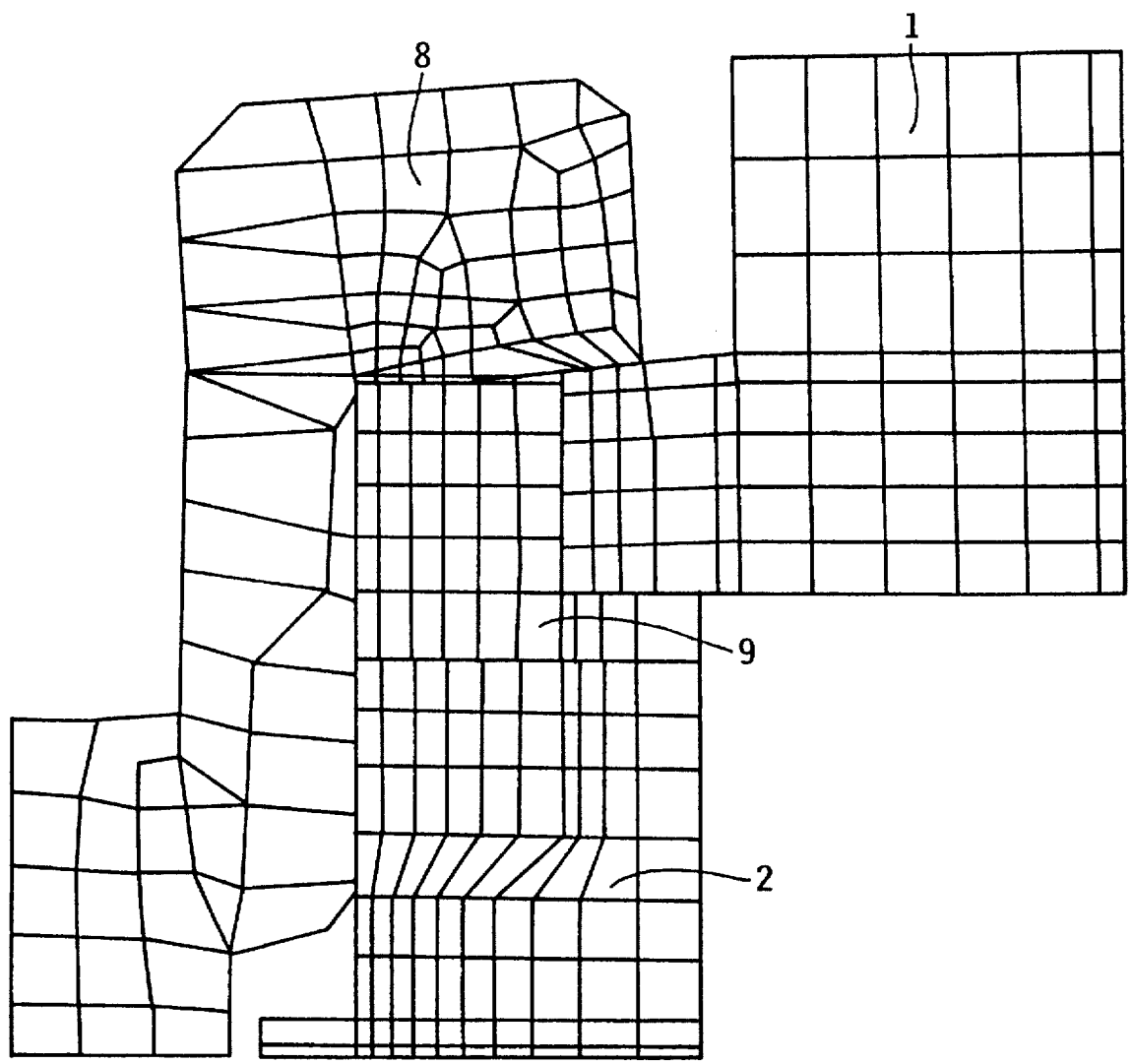

This uncontrolled movement can be greatly reduced by using the bush, as can be seen from FIG. 5b. The horizontal displacement of vertical grid lines between the spindle shaft and the bush is clearly much less than in FIG. 5a. The much smaller slip means that any possible shift between the spindle shaft and the bush is greatly reduced. Since the bush itself is firmly located with respect to the aluminium support by the interference fit, the overall result is that any movement of the spindle shaft axis relative to its support is much reduced. This helps to minimise head/track misalignment.

The effectiveness of the invention can be seen from experimental results obtained for a steel spindle shaft mounted into an aluminium wall. Initially the radial displacement on thermal cycling between the spindle shaft end and the wall was found to be about 4 microns, but the inclusion of the load transfer member and relieving the ends of the spindle shaft reduced this to below measurable amounts (i.e. less than 0.8 microns).

We claim:

1. A disk file comprising:

a support structure (1) including first and second opposed wall portions;

a non-rotatable shaft (2), extending in an axial direction from said first wall portion to said second wall portion;

a recording subassembly (3,4) rotatably mounted on said shaft;

clamping means (8) for clamping a first end of said shaft to the first wall portion in an axial direction, wherein said shaft end has a coefficient of thermal expansion dissimilar from that of said first wall portion, so that as a result of differential thermal expansion the two are susceptible to relative shifting movement in a direction transverse to the shaft axis, wherein said clamping means is a screw that passes through said first wall portion and said load transfer member, and is threaded into said first shaft end along the shaft axis; said screw having a coefficient of thermal expansion similar to that of said shaft and said load transfer member;

and a load transfer member (9) between the shaft end and first wall portion, wherein said first wall portion has an inner surface surrounding and facing said shaft axis, and wherein said load transfer member forms an interference fit with said inner surface of the first wall portion and has a coefficient of thermal expansion sufficiently close to that of the shaft to reduce the tendency to relative shifting movement due to differential thermal expansion over the contact area between said load member and the shaft end, wherein the load transfer member is a bush of substantially hollow cylindrical shape that separates said screw from said first wall portion.

2. A disk file as claimed in claim 1, wherein said bush includes an outward flange at one end between said first shaft end and said first wall portion.

3. A disk file comprising:

a support structure (1) including first and second opposed wall portions;

a non-rotatable shaft (2), extending in an axial direction from said first wall portion to said second wall portion, wherein both wall portions are part of a single metal casting, with both ends of the shaft attached to the respective wall portion in like fashion, a recording subassembly (3,4) rotatably mounted on said shaft;

clamping means (8) for clamping a first end of said shaft to the first wall portion in an axial direction, wherein said shaft end has a coefficient of thermal expansion dissimilar from that of said first wall portion, so that as a result of differential thermal expansion the two are susceptible to relative shifting movement in a direction transverse to the shaft axis;

clamping means for clamping a second shaft end to the second wall portion in an axial direction, wherein said second shaft end has a coefficient of thermal expansion dissimilar from that of said second wall portion, so that as a result of differential thermal expansion the two are susceptible to relative shifting movement in a direction transverse to the shaft axis;

a load transfer member (9) between the shaft end and first wall portion, wherein said first wall portion has an inner surface surrounding and facing said shaft axis, and wherein said load transfer member forms an interference fit with said inner surface of the first wall portion and has a coefficient of thermal expansion sufficiently close to that of the shaft to reduce the tendency to relative shifting movement due to differential thermal expansion over the contact area between said load member and the shaft end; and a load transfer member between the second shaft end and the second wall portion, wherein the second wall portion has an inner surface surrounding and facing said shaft axis, and wherein said load transfer member forms an interference fit with said inner surface of the second wall portion and has a coefficient of thermal expansion sufficiently close to that of the shaft to reduce the tendency to relative shifting movement due to differential thermal expansion over the contact area between said load member and the second shaft end.

4. A disk file comprising:

a support structure (1) including first and second opposed wall portions;

a non-rotatable shaft (2), extending in an axial direction from said first wall portion to said second wall portion;

a recording subassembly (3,4) rotatably mounted on said shaft;

clamping means (8) for clamping a first end of said shaft to the first wall portion in an axial direction, wherein said shaft end has a coefficient of thermal expansion dissimilar from that of said first wall portion, so that as a result of differential thermal expansion the two are susceptible to relative shifting movement in a direction transverse to the shaft axis;

and a load transfer member (9) between the shaft end and first wall portion, wherein said first wall portion has an inner surface surrounding and facing said shaft axis, and wherein said load transfer member forms an interference fit with said inner surface of the first wall portion and has a coefficient of thermal expansion sufficiently close to that of the shaft to reduce the tendency to relative shifting movement due to differential thermal expansion over the contact area between said load member and the shaft end, wherein said shaft has an outer portion (10) having a relief therein so that the load transfer member contacts the shaft end near the shaft axis.

5. A disk drive comprising:

a support structure made of a first material having a first wall portion with a first opening therein and a second wall portion having a second opening therein;

a shaft mounted between said first opening and said second opening, said shaft made of a second material;

at least one disk rotatably mounted to said shaft;

means for rotating said at least one disk;

first means for reducing relative shifting between said support structure and said shaft due to differences in thermal expansion between said first and second material, said first means for reducing relative shifting fits within said first opening;

second means for reducing relative shifting between said support structure and said shaft due to differences in thermal expansion between said first and second material, said second means for reducing relative shifting fits within said second opening, wherein both said first and second means for reducing relative shifting are bushings which contact the ends of said shaft, wherein said first opening forms a first inner surface of said first wall, said first inner surface surrounding and facing the axis of said shaft, and wherein the first means for reducing relative shifting fits within said first opening, and abuts said first inner surface by way of an interference fit, and wherein said second opening forms a second inner surface of said second wall, said second inner surface surrounding and facing the axis of said shaft, and wherein the second means for reducing relative shifting fits within said second opening, and abuts said second inner surface by way of an interference fit;

first clamping means passing through said first opening and said first means for reducing relative shifting to attach the shaft at one end; and second clamping means passing through said second opening and said second means for reducing relative shifting to attach the shaft at the other end.

* * * * *

UNITED STATES PATENT AND TRADEMARK OFFICE
CERTIFICATE OF CORRECTION

PATENT NO.    : 5,563,750

DATED         : October 8, 1996

INVENTOR(S)   : Graham N. Dew, Michael W. Hall, Anthony R. Hearn, and Julian T. Young It is certified that error appears in the above-identified patent and that said Letters Patent is hereby corrected as shown below:

Claim 1, Col. 7, Line 3, "shall" should be --shaft--.

Signed and Sealed this

Tenth Day of December, 1996

Attest:

BRUCE LEHMAN

*Attesting Officer*    *Commissioner of Patents and Trademarks*